United States Patent [19]

Barabas

[11] 3,929,735
[45] Dec. 30, 1975

[54] COPOLYMERS OF AN N-VINYL LACTAM AND AN UNSATURATED LACTONE

[75] Inventor: Eugene S. Barabas, Watchung, N.J.

[73] Assignee: GAF Corporation, New York, N.Y.

[22] Filed: Jan. 9, 1973

[21] Appl. No.: 322,109

[52] U.S. Cl. .... 260/78.3 UA; 210/54; 260/79.5 NV; 424/70
[51] Int. Cl.² .......................................... C08F 15/02
[58] Field of Search ................ 260/78.3 UA, 88.3 L

[56] References Cited
UNITED STATES PATENTS 2,982,762   5/1961   Voeks ............................ 260/88.3 L Primary Examiner—Christopher A. Henderson, Jr.
Attorney, Agent, or Firm—Walter C. Kehm; James N. Blauvelt

[57] ABSTRACT

There is disclosed a copolymer having the formula

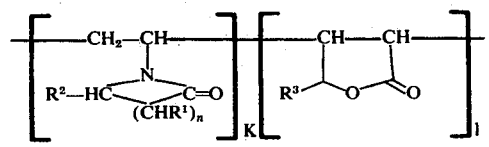

wherein K and l are integers representing the number of monomer units in the polymer, $R^3$ is hydrogen or alkoxy; alkyl of 1 to about 6 carbon atoms, each $R^1$ is hydrogen, methyl or ethyl, $R^2$ is hydrogen or alkyl of 1 to 4 carbon atoms and n is an integer of 2 to 4; methods of making same and products made therefrom.

8 Claims, No Drawings

COPOLYMERS OF AN N-VINYL LACTAM AND AN UNSATURATED LACTONE

BACKGROUND OF THE INVENTION

This invention relates to film forming polymers, more particularly to such polymers formed by the reaction of an N-vinyl lactam and an unsaturated lactone and to processes for their production.

DESCRIPTION OF THE PRIOR ART

Copolymers of N-vinyl lactams, and particularly N-vinyl pyrrolidone, with various unsaturated compounds, are well known in the art and have been used in industry as coatings, textile sizes, adhesives and the like. However, in the formation of these polymers previously, it has not been possible to introduce unsaturated lactone groups into the copolymers. Polymers containing such groups are highly desirable as such groups represent a functionality useful for yielding a wide variety of products. A major use for the above copolymers is as flocculating agents, as absorption media, humectants, hair-spray resins, etc.

In accordance with this invention, it has been found that solid, high molecular weight products can be obtained by copolymerizing unsaturated lactones with N-vinyl-2-pyrrolidone.

SUMMARY OF THE INVENTION

Accordingly, it is one object of this invention to provide improved polymers of N-vinyl lactams and an unsaturated lactone which overcome or otherwise mitigate the problems of the prior art.

A further object of this invention is to provide copolymers of N-vinyl lactams and units of an unsaturated lactone.

Another object of this invention is to provide improved polymeric materials which can be used as flocculating agents, absorption media, humectants, hair-spray resins and the like and contain functional groups which enable them to be converted to a still wider variety of products.

Said copolymers are substantially insoluble in esters (e.g., ethylacetate), in aliphatic and aromatic hydrocarbons and chlorinated solvents, but are readily soluble in water, alcohols ketones, dimethyl formamide or N-methyl-2-pyrrolidone.

Further objects and advantages of the invention will become apparent from the following detailed description thereof.

According to this invention, satisfaction of these objects and advantages is achieved by the reaction of monomers of (a) an N-vinyl lactam; and (b) an unsaturated lactone to produce a copolymer possessing properties superior to those known in the art. The polymeric compositions prepared according to this invention are high molecular weight polymers of the components, the polymerization thereof being effected through the double bonds of the reactants, i.e., by vinyl polymerization.

The copolymers of this invention contain polymerized units of N-vinyl lactam and unsaturated lactone and have the following structual formulae:

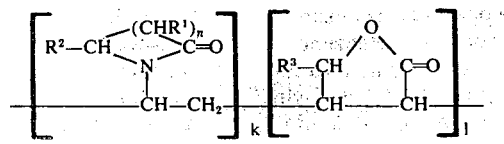

where $R^3$ may be hydrogen, alkyl group, alkoxy group, or other substituents, $R^1$, $R^2$, $n$, $k$ and $l$ as above defined.

DESCRIPTION OF PREFERRED EMBODIMENTS

As indicated above, the polymers of this invention are prepared by the reaction of (a) an N-vinyl lactam monomer, and (b) an unsaturated lactone.

Useful N-vinyl lactams which may be employed in this invention can be conveniently characterized by the formula:

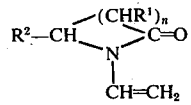

wherein each $R^2$ individually represents a member selected from the group consisting of hydrogen, methyl and ethyl, $R^2$ represents a member of the group consisting of hydrogen and alkyl groups containing from 1 to about 4 carbon atoms and n represents a whole positive integer of from 2 through 4. Preferred lactams of this type are thos wherein $R^1$ and $R^2$ are both hydrogen.

Typical N-vinyl lactams which may be used include
N-vinyl-2-pyrrolidone,
N-vinyl-2-piperidone,
N-vinyl-2-caprolactam,
N-vinyl-3-methyl-2-pyrrolidone,
N-vinyl-3-methyl-2-piperidone, or
N-vinyl-3-methyl-2-caprolactam,
N-vinyl-4-methyl-2-pyrrolidone,
N-vinyl-4-methyl-2-piperidone or
N-vinyl-4-methyl-2-caprolactam,
N-vinyl-5-methyl-2-pyrrolidone,
N-vinyl-5-methyl-2-piperidone,
N-vinyl-3-ethyl-2-pyrrolidone,
N-vinyl-4,5-dimethyl-2-pyrrolidone,
N-vinyl-5,5-dimethyl-2-pyrrolidone,
N-vinyl-3,3,5-trimethyl-2-pyrrolidone,
N-vinyl-5-methyl-5-ethyl-2-pyrrolidone,
N-vinyl-3,4,5-trimethyl-3-ethyl-2-pyrrolidone,
N-vinyl-6-methyl-2-piperidone,
N-vinyl-6-ethyl-2-piperidone,
N-vinyl-3,5-dimethyl-2-piperidone,
N-vinyl-4,4-dimethyl-2-piperidone,
N-vinyl-4,4-dimethyl-2-piperidone,
N-vinyl-7-methyl-2-caprolactam,
N-vinyl-7-ethyl-2-caprolactam,
N-vinyl-3,5-dimethyl-2-caprolactam,
N-vinyl-4,6-dimethyl-2-caprolactam and
N-vinyl-3,5,7-trimethyl-2-caprolactam.

Of these several compounds, N-vinyl-2-pyrrolidone is most preferred as it is readily available and provides products having excellent properties.

The unsaturated lactones used as copolymers in accordance with the instant invention may be represented by the following formula:

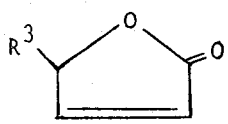

a β-unsaturated-γ-lactone, wherein $R^3$ is as above described.

Representative groups for $R_3$ include the following:

a. Alkyl groups and substituted alkyl groups of 1 to about 6 carbon atoms, either straight or branched chained, e.g. methyl, ethyl, n-propyl, isopropyl, n-butyl, isobutyl, n-pentyl, n-hexyl, hydroxyalkyl, e.g. hydroxymethyl, 2-hydroxyethyl, 3-hydroxypropyl; haloalkyl, e.g. chloromethyl, 2-chloroethyl, 3-chloropropyl, etc. and the like.

b. Alkoxy group of 1 to 4 carbon atoms, e.g., methoxy, ethoxy, etc.

Preferred groups are those where $R^3$ is an alkyl group of 1 to about 4 carbon atoms, because of their relative ease of preparation, availability and properties of products produced therefrom.

The copolymer system described in present invention can be varied over a wide range by:

a. changing the ratio of the comonomers;
b. using various unsaturated lactones with different substituents on the R groups;
c. the combination of (a) to (b)

It will be seen therefore that the resulting polymer provides functionalities through which they may be subjected to various chemical reactions to yield a variety of products. Thus, the polymers of the invention provide a wide and flexible range of properties.

The ratio of each of the comonomers may be varied as desired over a wide range consistent with attainment of the desired properties. However, for obtaining optimum properties of the copolymers, the following ratios by weight of the monomers are preferred:

| Monomer | Weight |
| --- | --- |
| N-vinyl lactam | 5 to 99 |
| unsaturated lactone | 1 to 95 |

The polymers of this invention resulting from reaction of the above components consist of the units of vinyl lactams, and the units of an unsatureated lactone. These polymers may be characterized as having the following general structure:

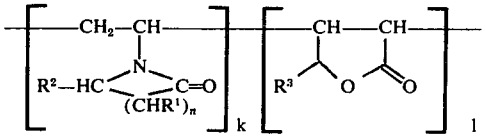

wherein $k$, and $l$ are integers representing the number of monomer units in the polymer and $R^1$, $R^2$, $R^3$ and $n$ are as defined above.

These polymers, as indicated above, are useful as flocculating agents, absorption media, humectants, hair spray resin and in similarly related applications.

The polymers of this invention may be submitted to reactions characteristic to lactones. Thus, they may be reacted with primary amines, mercaptides, alcoholic HCl, thionyl chloride, etc., to yield a number of various substituted polymers with different, useful properties. Also, the polymers can be crosslinked through the functional group, by bifunctional small compounds (e.g. diamines) or by forming cross-linkable active groups on the polymers itself (e.g. by hydrolysis), by heat treatment or by other ways known in the art.

The copolymerization may conveniently be carried out in solution. The solvent can be such in which both the monomers and the polymers are soluble, like e.g. N-methyl-2-pyrrolidone, or it can be one in which the monomers are soluble, but not the polymer (e.g. ethylacetate). In the latter case, the polymer precipitates out as it is formed.

The new polymers are conveniently prepared by subjecting a solution of the N-vinyl lactam and comonomer in the requisite amounts to conditions conducive to vinyl polymerization. Thus, copolymerization may be induced by the action of known free radicals and proceeds exothermically once initiated. Suitable chemical catalysts include organic peroxides and organic hydroperoxides, alkali metal persulfates, aliphatic azo compounds (e.g. azo-bis-isobutyronitrile), as well as other free radical catalytic compounds known to the art. The catalyst is employed in a catalytically effective amount which may range from about 0.01 to about 5.0 parts by weight based on the weight of the total mixture. Physical initiators such as high energy radiation may also be used by known methods.

The reaction is carried out in solution at temperatures above 30°C. ranging from about 40°C. to 130°C. or more; however, in order to avoid excessive exothermic conditions and to obtain desirable molecular weight polymers, it is generally preferred to initiate the copolymerization at about 70°–90°C. The reaction is preferably carried out in an inert atmosphere, conveniently under a blanket of nitrogen argon or the like, and at atmospheric pressure. Also anhydrous conditions should be used.

The following examples illustrate the invention but are not to be considered as limiting the same. In the examples, parts and percentages are by weight unless otherwise designated.

EXAMPLE I

Apparatus: 100 ml. flask equipped with mechanical stirrer, reflux condenser, nitrogen inlet tube and thermometer.

Procedure: Benzene 49.0 g. was placed in the flask and a mixture of 16.6 g. N-vinyl-2-pyrrolidone and 9.8 g. β-angelicalacetone was added. After adding 0.1 g. azo-bis-isobutyronitrile (AIBN), the system was purged with nitrogen, then it was heated until it boiled gently (87°C.). After 2 hours at reflux another 0.1 g. AIBN was added and the mixture was allowed to react for further 4 hours. Then the system was cooled and the solvent was removed in vacuo. The polymer was extracted in a Soxhlet-apparatus with ethylether in order to remove the unreacted monomers. The product was a colorless powder. (19.0g)

The composition of the polymer (determined by nitrogen analysis): 2 mole N-vinyl-2-pyrrolidone to 1 mole of β-angelicalactone. The infrared spectrum of the product (KBr-pellett) shows the characteristic triplet of the pyrrolidone-ring (at 1,418, 1,465, 1,495 cm$^{-1}$ frequency) and the characteristic absorption at 1,755 cm$^{-1}$ frequency related to the streching vibration of a lactone ring.

EXAMPLE II

Apparatus: as described in Example I.

Procedure: Benzene 60 g. was placed in the flask. The system was thoroughly purged with nitrogen. A mixture of 33.3 g N-vinyl-2-pyrrolidone and 10 g Δ-croton-lactone was added and it was stirred until the solution was opaque, but translucent. Azo-bis-isobutyronitrile, 0.05 g was added, and the system was heated to gentle boiling. The mixture was allowed to react for 2 hours, when 0.03 g catalyst was added, and the mixture was reacted for 4 more hours. After that the flask was cooled and the solvent was removed in vacuo. The polymer was extracted with ether yielding a light tan colored product. (38.8g)

EXAMPLE III

Apparatus: as described in Example I.

Procedure: Benzene 60 g, was placed in the flask. The system was thoroughly purged with nitrogen. A mixture of 33.3 g N-vinyl-2-pyrrolidone and 15.5 g ethyl-croton-lactone was added. t-Butylperoxypivalate 0,1g was added and the system was heated slowly to 50°C. At this temperature, a slightly exothermic reaction took place which raised the temperature to 55°C. After that the temperature was increased to gentle boiling and it was maintained for 2 hours. Then 0.05 g catalyst was added and the mixture was allowed to react for four more hours. The solvent was removed in vacuo, and the remaining material—tan colored solid—was extracted with ether for 4 days. After drying at 50°C, the polymer was obtained as white powdery material. (44.4g).

It is obvious that numerous changes and modifications can be made in the invention without departing from the spirit and scope thereof and all such obvious modifications are considered to be within the scope of the invention.

I claim:

1. A copolymer comprising approximately by weight
   a. 5 to 99% of an N-vinyl lactam of the formula

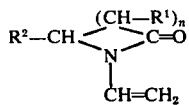

wherein $R^1$ is hydrogen, methyl or ethyl, $R^2$ is hydrogen or alkyl of 1 to 4 carbon atoms, and n is an integer of 2 to 4; and b. 1 to 95% of an unsaturated lactone selected from the group consisting of compounds having the formula

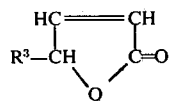

wherein $R^3$ is hydrogen, an alkyl group or an alkoxy group.

2. A copolymer as defined in claim 1 having the formula

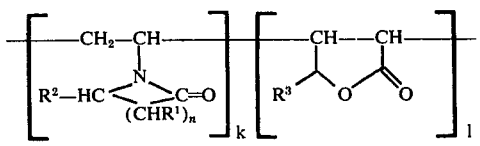

wherein k and l are integers representing the number of monomer units in the polymer, $R^3$ is hydrogen or alkoxy; alkyl of 1 to about 6 carbon atoms, each $R^1$ is hydrogen, methyl or ethyl, $R^2$ is hydrogen or alkyl of 1 to 4 carbon atoms and n is an integer of 2 to 4.

3. A copolymer as defined in claim 1 wherein component (a) is N-vinyl pyrrolidone.

4. A copolymer according to claim 3 wherein $R_3$ is selected from the group consisting of methyl, ethyl, n-propyl, isopropyl, n-butyl, isobutyl, n-pentyl, n-hexyl, n-octyl, nonyl, decyl, tridecyl, dodecyl, octadecyl, ethenyl, propenyl, propargyl, butynyl, hydroxymethyl, 2-hydroxyethyl, 3-hydroxpropyl, chloromethyl, chloroethyl, cyclopropyl, cyclooctyl, phenyl, tolyl, o-, m- and p-xylyl, 1-naphthyl, 2-naphthyl, benzyl and phenethyl.

5. A copolymer as defined in claim 1 wherein $R_3$ is hydrogen and (b) is croton-lactone.

6. A copolymer as defined in claim 1 wherein $R_3$ is methyl and (b) is β-Angelicalactone.

7. A copolymer as defined in claim 3 wherein (b) is β Angelica lactone.

8. A copolymer as defined in claim 5 wherein (b) is γ-ethyl-croton lactone.

* * * * *